A. J. BELL.
Steamboat-Staging.
No. 6,509. Reissued June 29, 1875.
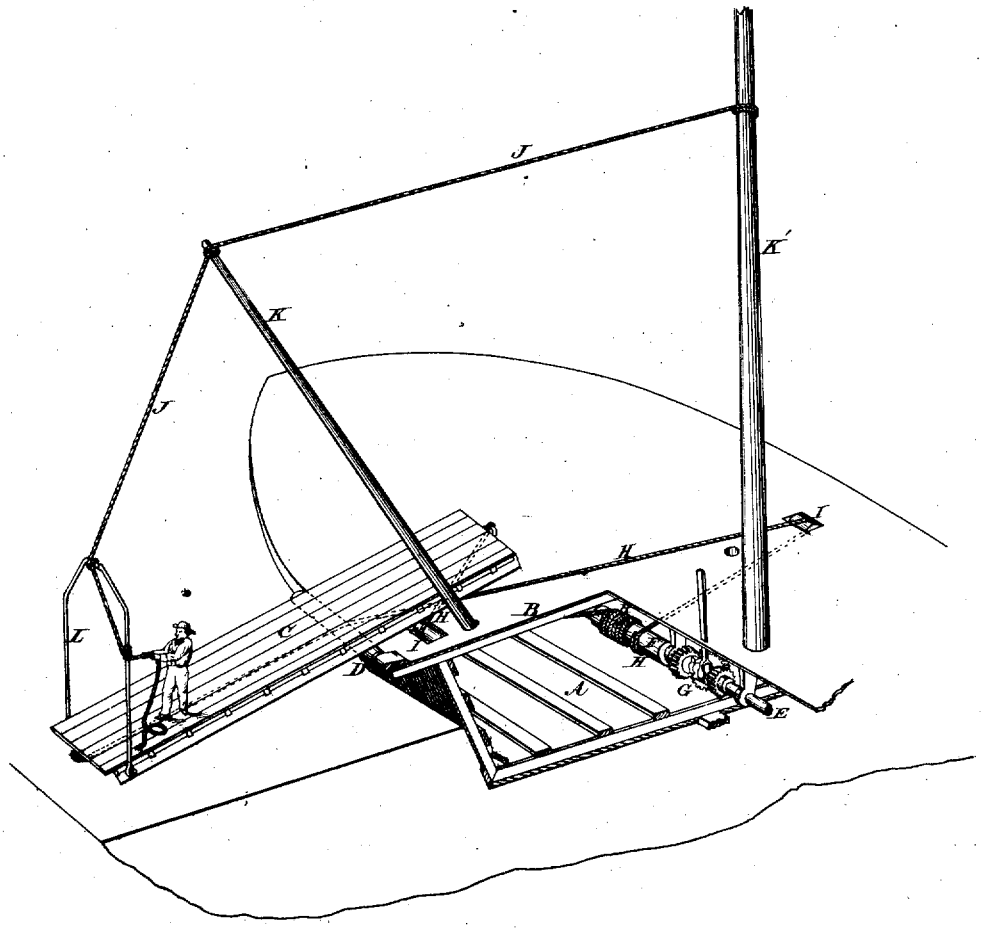
*Witnesses:*
Edwin James.
John R. Jones.
*Inventor:*
A. John Bell.
per J. E. J. Holmead,
Attorney.
THE GRAPHIC CO. PHOTO-LITH. 39 & 41 PARK PLACE, N.Y.

UNITED STATES PATENT OFFICE.

A. JOHN BELL, OF ASHLAND, KENTUCKY, ASSIGNOR, BY MESNE ASSIGNMENTS, TO CARSON MUDGE, E. K. CONVERSE, JOHN A. STEVENSON, J. W. NOYES, FRANK GAIENNIE, GEORGE E. SEARS, AND LIZZIE D. CLARKE, ADMINISTRATRIX OF THOMAS L. CLARKE, DECEASED.

IMPROVEMENT IN STEAMBOAT-STAGINGS.

Specification forming part of Letters Patent No. 31,147, dated January 22, 1861; extended seven years; reissue No. 6,509, dated June 29, 1875; application filed June 14, 1875.

*To all whom it may concern:*

Be it known that I, A. JOHN BELL, of Ashland, in the county of Boyd and State of Kentucky, have invented certain Improvements in Steamboat-Staging, for which Letters Patent of the United States No. 31,147 were granted on the 22d day of January, 1861; that CARSON MUDGE, E. K. CONVERSE, JOHN A. STEVENSON, J. W. NOYES, FRANK GAIENNIE, GEORGE E. SEARS, and Mrs. LIZZIE D. CLARKE, (administratrix of estate of Thos. L. Clarke, deceased,) are now the owners, through mesne assignments, of said Letters Patent; and that the following is a full, clear, and exact description of the same, reference being had to the accompanying drawing and the letters of reference marked thereon, making part of this specification, in which is represented a practical and operative arrangement of the mechanical features, the combination of which embodies my invention.

While my present invention is applicable to all classes of marine vessels, it is peculiarly adapted to the packets and other steamboats running on the Mississippi, its tributaries, and the other rivers of the South, and where the chief objects of transportation are such heavy and bulky freight as bales of cotton, hogsheads of sugar, &c.

It is well known to all familiar with the system of navigation that prevails on these waters that, not only on account of the character of the freight transported, but also on account of the manner in which the landings are effected, the boats are always provided with stages or gang-planks of great weight, not unfrequently weighing a ton, and from forty to sixty feet in length.

Now, previous to my invention, no mechanical device accomplishing such results as are accomplished by my invention had ever been employed to aid in handling these immense stages.

To utilize a suitable mechanical means for this purpose, and one which will permit of a more rapid, easy, and effective means of handling the stages on marine vessels, is the object of my invention; and which consists in arranging, in connection with the gang-plank or staging of a marine vessel, a suitable supporting crane or mast and a hoisting and lowering mechanism.

The construction and operation of my invention are as follows:

A B are portions of the hull and deck. C is the stage-plank. D is one of two gunwale-rollers, which serve to ease the passage of the plank over the edge of the boat. E is a shaft driven from the hoister or other steam-engine upon the boat. F is a drum, which can be driven from said shaft E in either direction, or be entirely disconnected therefrom, by means of a clutch-movement, G. Ropes or chains H from the drum F pass over rollers I in the deck, and, being crossed underneath the plank C, are attached to opposite ends thereof in the manner shown. The outer end of the plank is supported by a cord, J, which, extending from a boom and derrick, K K′, is secured by a pulley or other running attachment to a bow, L, which rises from the plank.

The operation is as follows: As the boat is nearing the bank or landing-place a deck-hand mounts the plank and seizes the cord J. At the word given the clutch G is thrown in gear, and, as the plank is moved out by the windlass, the operator lets the cord slip, so as to maintain the proper presentation of the plank in approaching the shore.

For shipping the plank all these movements are, of course, reversed.

Such an attachment, by diminishing the time required for shipping and unshipping the plank, will obviously cause a material saving in detention of the boat.

It will be seen that a plank thus operated by power can be made available as a spar for easing off the vessel from a shoal or bank.

What I claim as new, and desire to secure by Letters Patent of the United States, is—

1. In combination with a gang plank or staging, a suitable supporting crane or mast and a hoisting and lowering mechanism, substantially as described.

2. The arrangement of staging C, power-windlass E F G H I, and supporting apparatus J K L, the whole being constructed and operating together, substantially as and for the object set forth.

In testimony whereof I have signed my name to this specification in the presence of two subscribing witnesses.

A. J. BELL.

Witnesses:
E. B. FLETCHER,
F. R. FRENCH.